United States Patent [19]

Duncan et al.

[11] Patent Number: 4,714,979
[45] Date of Patent: Dec. 22, 1987

[54] PROTECTED POTTED METALLIZED FILM CAPACITOR

[75] Inventors: George I. Duncan, Glenview; Stephen L. Phelps, Chicago, both of Ill.

[73] Assignee: Advance Transformer Company, Chicago, Ill.

[21] Appl. No.: 943,478

[22] Filed: Dec. 16, 1986

[51] Int. Cl.⁴ .............................................. H01G 4/40
[52] U.S. Cl. ...................................... 361/274; 361/275
[58] Field of Search ........... 361/272, 274, 275, 433 W

[56] References Cited

U.S. PATENT DOCUMENTS

| | | | |
|---|---|---|---|
| 2,644,122 | 6/1953 | Boardman et al. | 361/275 X |
| 2,940,035 | 6/1960 | Lefkowitz | 361/275 X |
| 3,178,622 | 4/1965 | Paul et al. | 361/433 W X |
| 3,185,759 | 5/1965 | Sheehan | 361/272 X |
| 3,311,697 | 3/1967 | Quinn | 361/272 X |
| 3,496,432 | 2/1970 | Mo et al. | 361/275 X |
| 3,909,683 | 9/1975 | Kysely | 361/275 |
| 4,423,463 | 12/1983 | Serradimigni | 361/275 |
| 4,454,561 | 6/1984 | Pearce et al. | 361/275 |

FOREIGN PATENT DOCUMENTS

| | | | |
|---|---|---|---|
| 900252 | 12/1953 | Fed. Rep. of Germany | 361/275 |
| 2120611 | 11/1972 | Fed. Rep. of Germany | 361/272 |

Primary Examiner—Donald A. Griffin
Attorney, Agent, or Firm—Jack E. Haken; James J. Cannon, Jr.

[57] ABSTRACT

A protective system to prevent a dry metallized film capacitor from exploding or catching fire in the event that an internal short or fault occurs within the capacitor section utilizes a fuse and a thermal protector connected in series with the capacitor section and within its case. The fuse serves to protect the unit from a fault-induced low resistance high current in-rush, while the thermal protector is triggered by a fault-induced high resistance low current. A heat reflective circumferential sheet and positioning of thermal protector maximize its value in the protective system.

8 Claims, 2 Drawing Figures

PROTECTED POTTED METALLIZED FILM CAPACITOR

BACKGROUND OF THE INVENTION

1. Field of the Invention

The invention pertains to the field of dry metallized film capacitors and in particular dry metallized polypropylene capacitors for use, for example, in high intensity discharge ballasts, said capacitors having a protective system to prevent the capacitor from exploding or catching fire under short-circuit conditions. The protective system uses both thermal and electrical fault interruptors.

2. Description of the Prior Art

There is virtually no known prior art either in the printed literature or in the patent literature in the field of dry metallized film capacitors having internal fault interruptors. The little that is known about the prior art is that internal fault interruptors have generally been either of thermal or pressure sensitive types. A capacitor protected solely by a thermal fault interruptor will be protected only in the event of a low current application in which over time the internal heat will rise sufficiently to trigger the fault interruptor. In the situation in which the thermal interruptor is used with an AC capacitor in a plastic can, such a device does not often suffice because the internal heat generated prior to the activation of the fault interruptor can cause the plastic of the can to melt and an unacceptable leakage current situation develops. This occurs in particular under conditions in which a hot spot is present and the plastic of the can becomes contaminated with metal from the metallized surface of the capacitor film roll.

The prior patent art on dry metallized film capacitors with fault interruptors includes British Pat. No. 1,569,186 which discloses a film capacitor in which the capacitor roll deforms when heated, breaking a contact. It is unclear whether a dry or a wet capacitor is intended. The problem with this device is that by the time the internal temperature is high enough to deform the film roll, some other interruption would have occurred, such as a bursting of the case or a melt down of the plastic case.

U.S. Pat. No. 3,496,432 also pertains to a dry film capacitor relying on temperature to break a contact.

U.S. Pat. No. 3,909,683 teaches a pressure sensitive fault interruptor in a dry film capacitor. It provides a yielding cavity with a fusible portion of one lead wire passing therethrough. In the event of overpressure caused by a fault, at least one contact bridge is separated. Unfortunately, gases accumulate in the cavity and can be ignited by a spark from the breaking of the contact. The device tends to be too explosive for commercial use.

Until very recently, as a result of changes in UL requirements, no dry film capacitors with fault interruptors have been commercially available, indicating that the few devices disclosed in the prior patent literature have little or no commercial value, despite proposed UL requirements which have been published in capacitor-UL-810.

The literature on wet film capacitors with fault interruptors is extensive; typical recent U.S. patents are U.S. Pat. Nos. 4,398,782 and 4,454,561.

The prior art either in the literature or in commerically available products does not disclose an internal fault interruptor for dry metallized film capacitors which operate over a wide range of current wherein the interruptor includes both thermal and current sensitive protective devices.

SUMMARY OF THE INVENTION

This invention pertains to metallized film capacitors for use with high intensity discharge ballasts, motor run capacitors, and the like, wherein such capacitors must operate over a wide range of current and must include fault interruptors. The purpose of a capacitor with a fault interruptor is to electrically isolate the capacitor from a power source when the capacitor has developed a complete or a partial short within the windings of the capacitor itself. The invention provides a protected metallized film capacitor in which the protection is accomplished by utilizing a combination of a current activated fuse and a heat actuated thermal protector which are connected in series with the capacitor. The wound capacitor roll is wrapped in aluminum foil to divert heat generated by a fault inward to the hollow core of the capacitor section, as well as to contain any molten material. The thermal protector is electrically connected to one lead and situated within the core to increase its sensitivity to temperature changes. A current activated fuse is electrically connected to the other lead. The protection from this combination is very effective because it covers the spectrum of possible failure modes in dry metallized film capacitors. In the event that the in rush of current is very high, which could cause the capacitor case to rupture violently, the fuse serves as a protective device against such a failure. On the other hand, if the in-rush of current is low enough so that it would not take out a fuse, the low current will cause the capacitor to heat up to a point at which the thermal protector would be activated to prevent a fire or melting of the plastic housing.

DESCRIPTION OF THE PREFERRED EMBODIMENT

Figure 1:
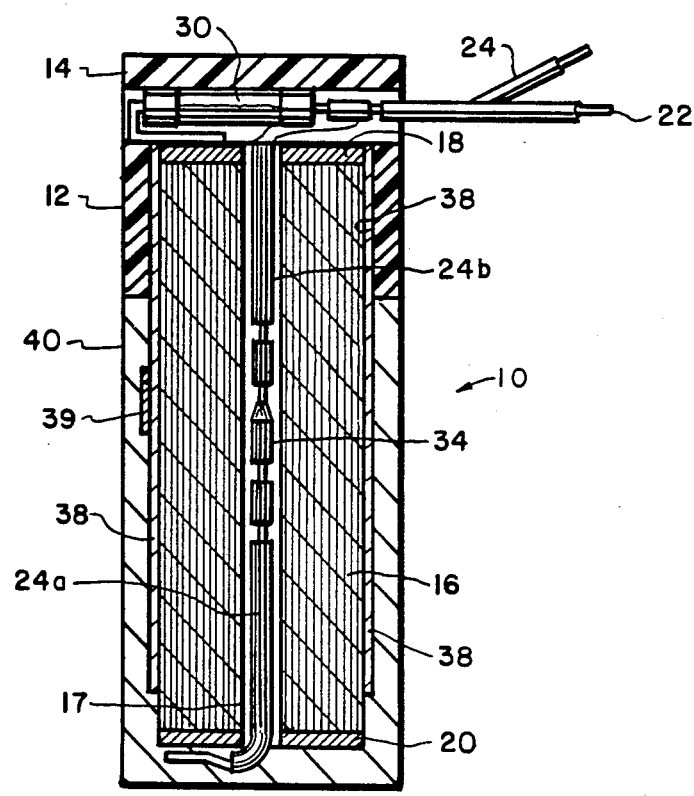
FIG. 1 is a cross sectional view of a dry metallized film high intensity discharge ballast capacitor with the fault interruptor of the present invention in place.

FIG. 1 illustrates a dry metallized film capacitor 10, having a typical construction but incorporating therein the protective fault interruptor of the present invention. Such capacitors may be used as motor start or motor run capacitors or with high intensity discharge ballasts. Capacitor 10 has a plastic case 12, a plastic cover 14 and contains a metallized film capacitor section or roll 16 of metallized polypropylene with a hollow core 17. Capacitor section 16 has metallic contact points or terminals 18, 20 to which typically lead wires 22, 24 are electrically and mechanically secured. As explained below, each lead is connected differently to incorporate the fault interruptor of the present invention which provides a protected film capacitor.

Case 12 and cover 14 may be made of any non-conductive materials which meet the performance standards for such a capacitor. Typically, GE Noryl (TM) or a polyphenylene-based resin are used. The capacitor section 16 is usually a roll of metallized polypropylene, two sheets being wound together on a roll, one sheet for each plate, and the film for one plate being extended at each side so that each end of the capacitor section may be shooped to form metallic contact points 18, 20 for an electrical connection to one plate at each end. The capacitor section 16 is usually wound on an arbor and when removed therefrom has a hollow core 17.

FIG. 1 also shows the preferred embodiment of the protective fault interruptor of the present invention in an operational condition as installed in the typical AC high intensity discharge ballast capacitor 10. The purpose of the fault interruptor is to isolate the dry metallized film capacitor from a power source when the capacitor has developed a complete or a partial short within the windings of the capacitor itself. During such a fault, between the terminals 18, 20 of the capacitor 10, internal to the capacitor section 16, either a pressure or a temperature is developed within the capacitor roll as a result of the breakdown of the dielectric, producing a slowly rising temperature in the case of a low current flow or various gases in the case of a higher current flow. In a low temperature mode, in a low amperage operational environment, the temperature inside the case 12 will tend to rise slowly, eventually developing a hot spot in the side wall of the case and rupturing the plastic case by a melting thereof. In the case of a high current flow through the capacitor, gases will be produced from the dielectric and the expansion of the gases could cause a rupturing through an explosion. Gases are usually able to exit the capacitor at one end or the other thereof since they tend to concentrate in the core or at the top of the capacitor unit 10. The fault interruptor of the present invention involves a protective system for a plastic encased metallized polypropylene film dry capacitor, using a fuse to protect against an in-rush of high current and a thermal protector to protect against a current which is low enough that it would not take out a fuse but nevertheless over time causes a capacitor to heat up to a point at which a fire could occur or the plastic case would melt and therefore be ruptured.

The invention incorporates both a fuse and a thermal protector to cover the spectrum of possible failure modes. The fuse and the thermal protector are connected in series with the capacitor section. In addition, it is advantageous that the thermal protector be well placed in the capacitor unit 10 to increase its sensitivity to temperature changes. Referring to FIG. 1, the preferred embodiment of the protective circuit of the present invention consists of three additional principal components. One component is a fuse 30 to protect the capacitor 10 from over currents. The second component is a thermal protector 34 and the third component is a sheet of aluminum foil 38. The thermal protector 34 and the aluminum foil 38 cooperate together to protect the capacitor 10 from over temperature. These three additional components all cooperate to protect capacitor 10 from any failure due to an internal fault in capacitor section 16.

In the preferred embodiment, a fuse 30 is electrically connected at one end to first contact point 18 and at its other end to first lead 22 within case 12. For the intended use of a high intensity discharge ballast capacitor, the fuse 30 is preferably Little Fuse or Buss 3AG/3AG3/3A-7A, or the like. A second lead 24 is electrically connected to second contact terminal 20, at the opposite end of capacitor section 16. Second lead 24 is spliced into sections 24a, connected to contract point 20, and 24b. A one shot thermal protector 34, such as a Microdisc 5000 series or 4000 series, 117°, is electrically connected between sections 24a and 24b of second lead 24. Lead 24 is then fed through hollow core 17 of capacitor section 16 such that thermal protector 34 is approximately centered between the ends of hollow core 17. Second lead section 24b continues through core 17 to the top and then exits case 12 at an appropriate point.

A thin sheet of aluminum foil 38 is wrapped around the circumferential perimeter of capacitor section 16. It is preferred that foil 38 be in contact with one shooped edge, but avoiding electrical contact with the other shooped edge 18, 20. Foil 38 is held in a tightly wrapped position by any suitable fastening means such as tape 39 or adhesive. The sheet of aluminum foil could be replaced by any other material which could contain the heat generated by a fault and prevent melted film from spreading before the thermal protector 34 is actuated.

The entire assembly of capacitor roll 16, leads 20, 24, fuse 30, thermal protector 34 and aluminum foil 38 is placed in case 12. Potting material 40 is placed in case 24 to cover about three-fourths of the assembly. It is not necessary to put any potting material 40 in core 17 or completely fill the case 12. Leads 22, 24 are placed in lead slots (not shown) in case 12, and cover 14 is affixed to case 12 by an suitable means, such as ultrasonic welding.

The operation of protected capacitor 10 is as follows. When voltage and current are applied to a unit of capacitor 10 which an as internal fault or is shorted, one of two events can occur. First, if the short is of low resistance, an increase in current will occur. Second, if the resistance is high, the current will be low enough to pass through the short and heat up the capacitor. The heat within the capacitor will also cause an increase in gaseous pressure within the sealed capacitor case 12, but there will be no increase in pressure without first having an increase in temperature.

For the first event, an over current or a sudden in-rush of current, the fuse 30 is used for protection. The fuse rating is determined by the capacitance, voltage and cycles/second. The operation of the fuse is well known.

For the second event, a slow rise in temperature, the invention uses a one shot thermal protector 34 and a sheet of aluminum 38. The aluminum is wrapped around the capacitor section 16 in contact with only one shooped edge, and serves to reflect the heat generated from a short back into the capacitor section 16, towards its core 17. With this concentration of reflected heat, the thermal protector 34 positioned within core 17 will open before any damage can be done to the capacitor 10.

The present invention incorporates both the fuse and the thermal protector to cover the wide spectrum of possible failure modes which can occur in a high intensity discharge ballast capacitor. In either event, either the fuse or the thermal protector will be activated and, since they are connected in series, the circuit will be interrupted by the interruption of one lead thereof. Also in the present invention, since a fuse is used rather than a type of diaphragm which will interrupt a contact upon the exertion of pressure, the large surges of electric current which would normally produce gases within a faulted metallized film capacitor, will trigger the fuse before the gases accumulate to cause an explosion or other type of rupture of case 12. No possible restrike can occur, and the capacitor will remain within its case because the interruption of the circuit will occur before any possible rupture of the case. The interruption will occur before either a hot spot, a melting of plastic or an explosion of gases will occur. With this combination of a fuse and thermal protection, a complete protective system is utilized to cover all aspects of failure due to shorts.

Table 1 presents a partial listing of capacitor types rated by microfarads and the approximate amperage at which the fuse must flow to provide effective protection. Some of these capacitors may have discharge resistors.

TABLE 1

| Capacitor uf | Rated Voltage | Fuse Amps |
| --- | --- | --- |
| 6 | 280 | ¾ |
| 7 | 280 | ¾ |
| 8 | 280 | 1.5 |
| 10 | 280 | 1.5 |
| 17.5 | 280 | 3 |
| 20 | 280 | 3 |
| 22.5 | 280 | 3 |
| 24 | 280 | 4 |
| 28 | 280 | 4 |
| 35 | 280 | 4 |
| 35 | 280 | 7 |
| 48 | 280 | 7 |

The one-shot thermal protector will blow when the internal temperature reaches about 117°. The ratings of Table 1 and the thermal protector are effective to meet any presently known UL standards. The thermal protector in general should be rated somewhere between the maximum rated operating temperature of the capacitor and the maximum rating of the capacitor materials.

Figure 2:
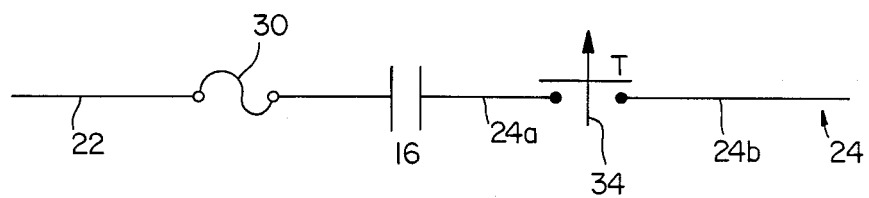
FIG. 2 is a schematic diagram of the protected capacitor of the present invention.

FIG. 2 is a schematic of the electrical circuit of the present invention. It should be noted that since the fuse 30, capacitor section 16 and thermal protector 34 are connected in series, the sequence of these components in the circuit construction may be changed without affecting its function.

The protective fault interruptor of the present invention differs significantly from and has many advantages over the prior art. Since the capacitor has a wide range of operating conditions, especially in terms of current flowing therethrough, this protective fault interruptor serves to protect the capacitor from a wide variety of possible failure modes. The combination of thermal and electrical protection as disclosed herein represents a significant advance in meeting safety requirements. The fault interruptor of the present invention uses only normal connections; no special connections are required. It is a very simple internal device. No major modifications to the case of the capacitor are required. The case does not require any special hermetic seal. And the device works with a fully encapsulated roll without requiring the case dimensions to change in order to interrupt a circuit.

What is claimed:

1. An AC capacitor having a protective fault interruptor system for its capacitor section, wherein said capacitor is a dry metallized film type capacitor, wherein said capacitor includes a metallized film capacitor section having a hollow core, shooped edges serving as contact points for each plate of said capacitor, wherein said contact points are spaced apart from one another, said capacitor being connectable to a circuit through electrical leads from said contact points, a case, potting material securing said capacitor section and a portion of said leads within said case, and said leads extending through a wall of said case, wherein the protective fault interruptor system for said capacitor section comprises:

a fuse electrically connected at one end to a first one of said contact points and connected at its other end to a first one of said electrical leads;

a second one of said leads being divided into two sections, a first section of said second lead being electrically connected to a second one of said contact points at one end of said lead;

a thermal protector connected to the second end of said first section of said second lead and to the first end of the second section of said second lead;

said second lead with said thermal protector being spliced therein passing through the hollow core of said capacitor such that said thermal protector is positioned centrally within said hollow core;

a heat reflective sheet wrapped around the circumferential perimeter of said capacitor section such that said heat reflective film is in contact with one of said shooped edges and is electrically insulated from the second of said shooped edges of said capacitor section;

said capacitor section, said fuse, said thermal protector and portions of said leads being within positioned said case;

said potting material securing said capacitor section within said case by covering more than one-half of the volume between said circumferential perimeter of said capacitor section and the interior wall of said case;

said fuse, said capacitor section and said thermal protector thereby being connected in series to isolate said capacitor section from an electrical circuit when a short of low or high resistance develops within said capacitor section.

2. The capacitor of claim 1 wherein said heat reflective material is aluminum foil.

3. An AC capacitor having a protective fault interruptor system for its capacitor section, wherein said capacitor is a dry metallized film high intensity discharge ballast type capacitor, wherein said capacitor includes a metallized film capacitor section, shooped edges serving as contact points for each plate of said capacitor, wherein said contact points are spaced apart from one another, said capacitor being connectable to a circuit through electrical leads from said contact points, a case, potting material securing said capacitor section and a portion of said leads within said case, and said leads extending through a side wall of said case, wherein the protective fault interruptor system for said capacitor section comprising:

a fuse;

a thermal protector;

said fuse and said thermal protector connected in series with said capacitor section through at least one of said leads; and said fuse, said thermal protector, said capacitor section and the connections to said at least one connecting lead all positioned within said case.

4. The capacitor of claim 3 wherein said thermal protector is positioned within said case to maximize its sensitivity to a rise in temperature within said case.

5. The capacitor of claim 3 further comprising:

a heat reflective, electrically conductive film wrapped around the circumferential perimeter of said capacitor section.

6. The capacitor section of claim 3 wherein said heat reflective electrically conductive film is aluminum foil.

7. The capacitor of claim 3 wherein said heat reflective sheet is in contact with only one of said two contact points.

8. The capacitor of claim 3 wherein:
said potting material is disposed around said capacitor section within said case;
said capacitor section is firmly sealed within said case; and
said fault interruptor is secured with said capacitor section within said case such that when a fault occurs either said fuse will be triggered by an excessive current or said thermal protector will be triggered by a heat rise within said case enclosing said capacitor section such that the electrical contact of the lead to which said thermal protector or said fuse are connected in series will interrupt, thereby isolating the faulty capacitor section from an electrical circuit.

* * * * *